US012253062B2

(12) United States Patent
Lumley

(10) Patent No.: US 12,253,062 B2
(45) Date of Patent: *Mar. 18, 2025

(54) APPARATUS FOR EXTRACTING POWER FROM FLUID FLOW

(71) Applicant: Airloom Energy, Inc., Laramie, WY (US)

(72) Inventor: Robert Lumley, Laramie, WY (US)

(73) Assignee: Airloom Energy, Inc., Laramie, WY (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/199,766

(22) Filed: May 19, 2023

(65) Prior Publication Data

US 2023/0287865 A1  Sep. 14, 2023

Related U.S. Application Data

(63) Continuation of application No. 16/673,879, filed on Nov. 4, 2019, now Pat. No. 11,913,430, which is a
(Continued)

(51) Int. Cl.
*F03D 5/04* (2006.01)
*F03B 17/06* (2006.01)
(Continued)

(52) U.S. Cl.
CPC ................ *F03D 5/04* (2013.01); *F03B 17/06* (2013.01); *F03D 7/022* (2013.01); *F03D 9/25* (2016.05); *F03D 13/10* (2016.05); *F03D 13/20* (2016.05); *F05B 2210/16* (2013.01); *F05B 2230/60* (2013.01); *F05B 2240/912* (2013.01); *F05B 2240/917* (2013.01); *F05B 2240/921* (2013.01);
(Continued)

(58) Field of Classification Search
CPC ..... F03D 5/04; F03D 9/25; F03D 9/11; F03D 13/10; Y02E 10/70
See application file for complete search history.

(56) References Cited

U.S. PATENT DOCUMENTS 3,504,988 A  4/1970  Herbert
3,730,643 A  5/1973  Davison
(Continued)

FOREIGN PATENT DOCUMENTS

CA  2750638 A1 *  2/2013  ............... F03D 5/00
CN  201179839      1/2009
(Continued)

OTHER PUBLICATIONS

Ahrens et al. (eds.), "Combining kites and rail technology into a traction-based airborne wind energy plant," in Airborne Wind Energy, Springer-Verlag, Berlin Heidelberg (2013) pp. 437-441.
(Continued)

*Primary Examiner* — Christopher P Ellis
(74) *Attorney, Agent, or Firm* — Morrison & Foerster LLP

(57) ABSTRACT

An apparatus for extracting power includes a track and an airfoil coupled to the track. The track includes first and second elongate sections, where the first elongate section is positioned above the second elongate section. The airfoil is moveable in opposite directions when alternately coupled to the first elongate section and second elongate section.

20 Claims, 8 Drawing Sheets

Related U.S. Application Data continuation of application No. 15/597,082, filed on May 16, 2017, now Pat. No. 10,465,654, which is a continuation of application No. 15/156,246, filed on May 16, 2016, now Pat. No. 9,651,027, which is a continuation of application No. 14/841,576, filed on Aug. 31, 2015, now Pat. No. 9,341,161, which is a continuation of application No. 14/618,885, filed on Feb. 10, 2015, now Pat. No. 9,126,683, which is a continuation-in-part of application No. PCT/US2015/012931, filed on Jan. 26, 2015.

(51) Int. Cl.
    *F03D 7/02* (2006.01)
    *F03D 9/25* (2016.01)
    *F03D 13/10* (2016.01)
    *F03D 13/20* (2016.01)

(52) U.S. Cl.
    CPC .............. *Y02E 10/20* (2013.01); *Y02E 10/70* (2013.01); *Y02E 10/72* (2013.01); *Y02E 10/728* (2013.01); *Y02P 70/50* (2015.11); *Y10T 29/49321* (2015.01)

(56) References Cited

U.S. PATENT DOCUMENTS

| | | | |
|---|---|---|---|
| 4,114,046 A | 9/1978 | Yousef | |
| 4,168,439 A | 9/1979 | Palma | |
| 4,186,314 A | 1/1980 | Diggs | |
| 4,302,684 A | 11/1981 | Gogins | |
| 4,350,895 A | 9/1982 | Cook | |
| 4,589,344 A | 5/1986 | Davison | |
| 4,705,520 A | 11/1987 | Ahrens | |
| 4,756,666 A | 7/1988 | Labrador | |
| 4,832,569 A | 5/1989 | Samuelsen et al. | |
| 4,859,146 A | 8/1989 | Labrador | |
| 4,868,796 A | 9/1989 | Ahrens et al. | |
| 5,007,910 A | 4/1991 | Anapliotis et al. | |
| 5,108,434 A | 4/1992 | Ahrens et al. | |
| 5,350,273 A | 9/1994 | Hector, Sr. et al. | |
| 5,374,235 A | 12/1994 | Ahrens | |
| 5,758,911 A * | 6/1998 | Gerhardt | F03D 5/04 290/55 |
| 6,016,014 A | 1/2000 | Grigorescu et al. | |
| 6,322,591 B1 | 11/2001 | Ahrens | |
| 6,436,144 B1 | 8/2002 | Ahrens | |
| 6,672,522 B2 * | 1/2004 | Lee | F03D 5/04 416/17 |
| 6,992,402 B2 | 1/2006 | Latyshev | |
| 7,215,036 B1 | 5/2007 | Gehring | |
| 7,604,454 B2 | 10/2009 | Power, III et al. | |
| 7,709,971 B2 * | 5/2010 | Sane | F03D 9/00 290/43 |
| 7,780,411 B2 | 8/2010 | Yan | |
| 7,859,126 B2 | 12/2010 | Ferguson | |
| 7,902,684 B2 * | 3/2011 | Davison | F03B 17/064 290/55 |
| 8,066,225 B1 | 11/2011 | Tigner | |
| 8,096,763 B2 | 1/2012 | Ahrens | |
| 8,164,213 B2 | 4/2012 | Mahaffy et al. | |
| 8,272,840 B2 | 9/2012 | Yan | |
| 8,319,368 B2 | 11/2012 | Ippolito et al. | |
| 8,322,035 B2 | 12/2012 | Yan | |
| 8,362,632 B2 | 1/2013 | Nielsen et al. | |
| 8,505,293 B2 | 8/2013 | Ahrens | |
| 2003/0066934 A1 * | 4/2003 | Bolonkin | F03D 13/20 244/153 R |
| 2004/0080166 A1 | 4/2004 | Davidson | |
| 2004/0164562 A1 * | 8/2004 | Latyshev | F03D 5/04 290/55 |
| 2007/0278796 A1 | 12/2007 | Power et al. | |
| 2008/0161860 A1 | 7/2008 | Ahrens et al. | |
| 2008/0197639 A1 | 8/2008 | Brander | |
| 2008/0231058 A1 | 9/2008 | Nicholson et al. | |
| 2009/0016884 A1 | 1/2009 | Yan | |
| 2009/0016892 A1 | 1/2009 | Yan | |
| 2009/0064737 A1 | 3/2009 | Fan | |
| 2009/0072092 A1 | 3/2009 | Griffith et al. | |
| 2009/0285681 A1 * | 11/2009 | Ahrens | F03D 5/00 416/1 |
| 2010/0026007 A1 | 2/2010 | Bevirt | |
| 2010/0032956 A1 | 2/2010 | Varrichio et al. | |
| 2010/0032965 A1 | 2/2010 | Kargilis et al. | |
| 2010/0307148 A1 * | 12/2010 | Ahrens | F03D 5/06 60/495 |
| 2010/0308174 A1 | 12/2010 | Calverley | |
| 2011/0076154 A1 | 3/2011 | Yan | |
| 2011/0115231 A1 * | 5/2011 | Mulye | F03B 17/064 290/54 |
| 2011/0198857 A1 | 8/2011 | Becker | |
| 2011/0260462 A1 | 10/2011 | Lind | |
| 2011/0281478 A1 | 11/2011 | Blumenthal | |
| 2012/0061972 A1 | 3/2012 | Young | |
| 2012/0121340 A1 | 5/2012 | Pao | |
| 2012/0298793 A1 | 11/2012 | Weddendorf et al. | |
| 2013/0001950 A1 | 1/2013 | Armstrong | |
| 2013/0043679 A1 | 2/2013 | Nomoto et al. | |
| 2013/0052014 A1 | 2/2013 | Kelly | |
| 2013/0221679 A1 | 8/2013 | Lind | |
| 2014/0152018 A1 | 6/2014 | Harrington | |
| 2014/0367973 A1 * | 12/2014 | Saavedra | F03D 9/45 290/55 |
| 2015/0233347 A1 | 8/2015 | Yan | |
| 2015/0240782 A1 | 8/2015 | Yan | |
| 2015/0369215 A1 | 12/2015 | Lumley | |
| 2016/0025071 A1 | 1/2016 | Wang et al. | |
| 2016/0153430 A1 | 6/2016 | Mahfoud | |

FOREIGN PATENT DOCUMENTS

| | | | |
|---|---|---|---|
| CN | 103790775 A * | 5/2014 | ............. F03D 5/04 |
| CN | 112469896 A * | 3/2021 | ............ B64C 39/022 |
| DE | 33 04 825 | 8/1984 | |
| DE | 101 46 085 | 4/2003 | |
| EA | 032002 B1 * | 5/2017 | |
| EP | 1 331 391 | 7/2003 | |
| EP | 2078853 | 7/2009 | |
| FR | 2 956 880 | 9/2011 | |
| JP | 2001 271737 | 10/2001 | |
| JP | 2013-508218 | 3/2013 | |
| WO | WO-87/04496 | 7/1987 | |
| WO | WO-02/02934 | 1/2002 | |
| WO | WO-2006/010783 | 2/2006 | |
| WO | WO-2007/070935 | 6/2007 | |
| WO | WO-2007/093118 | 8/2007 | |
| WO | WO-2007/109992 | 10/2007 | |
| WO | WO-2008/003230 | 1/2008 | |
| WO | WO-2009/064737 | 5/2009 | |
| WO | WO-2009/146602 | 12/2009 | |
| WO | WO-2010/087600 | 8/2010 | |
| WO | WO-2011/087541 | 7/2011 | |
| WO | WO-2012/127444 | 9/2012 | |
| WO | WO-2013/151678 | 10/2013 | |
| WO | WO-2014/087436 | 6/2014 | |
| WO | WO-2015/192181 | 12/2015 | |

OTHER PUBLICATIONS

International Search Report and Written Opinion for PCT/US2015/012931, mailed May 6, 2015, 6 pages.

Jafari, "Performance Analysis of PowerWindow: a Linear Wind Generator," Thesis, University of Wollongong, Research Online (2014) pp. 1-123.

NTS Energy and Transportsystems GmbH website http://www.x-wind.de/index.php/en, retreived from Internet Apr. 25, 2014, 2 pages.

Ponta et al., "Innovative Concepts in Wind-Power Generation: The VGOT Darrieus," Wind Turbines, Dr. Ibrahim Al-Bahadly (Ed.), (2011) Ch. 6, pp. 137-162.

(56) References Cited

OTHER PUBLICATIONS

Supplemental Partial European Search Report for EP 1 574 2937, dated Jan. 4, 2018, 8 pages.
International Search Report and Written Opinion for PTC/US16/16850, dated May 6, 2016, 10 pages.
International Search Report and Written Opinion for PCT/US17/023445, dated Jun. 5, 2017, 20 pages.

* cited by examiner

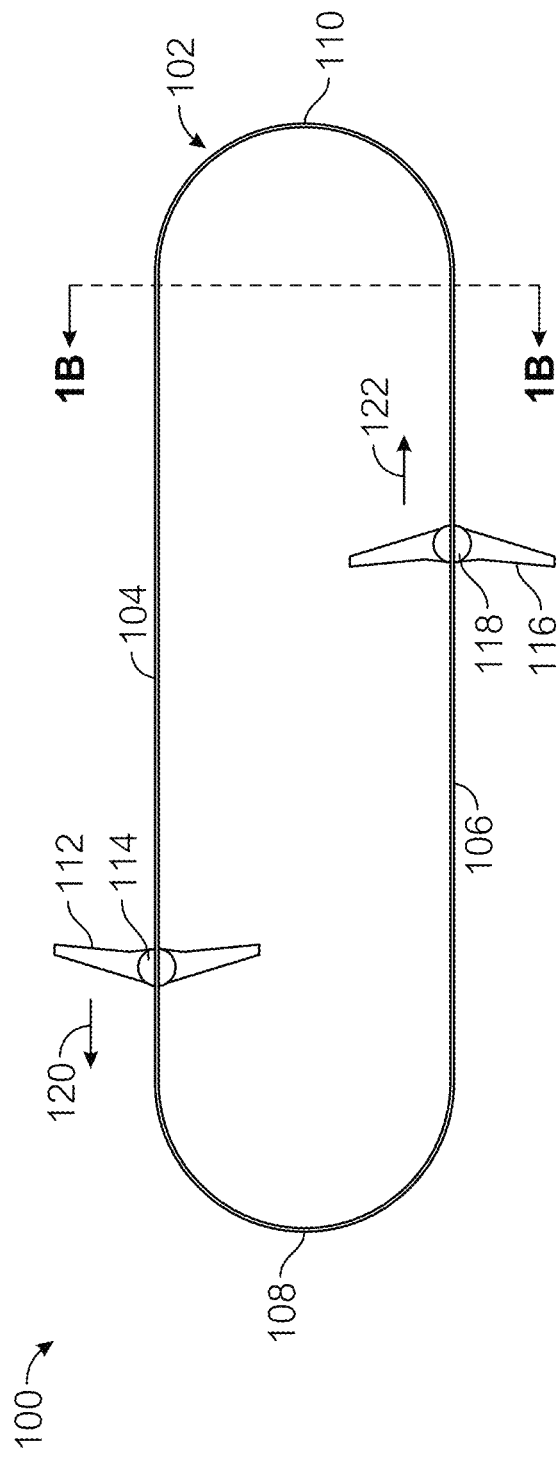
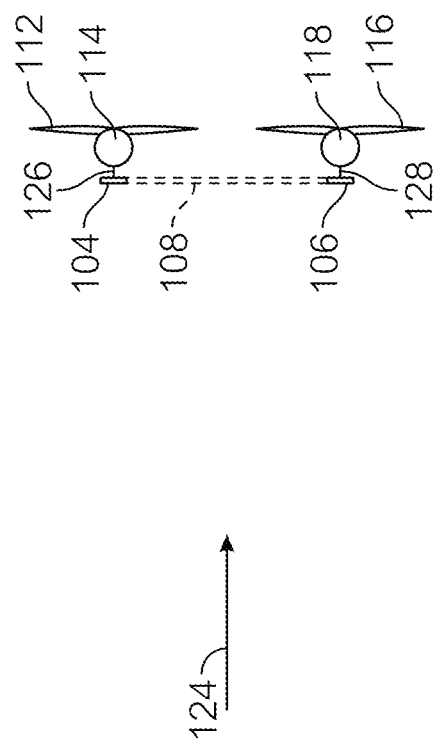
FIGURE 1A
FIGURE 1B

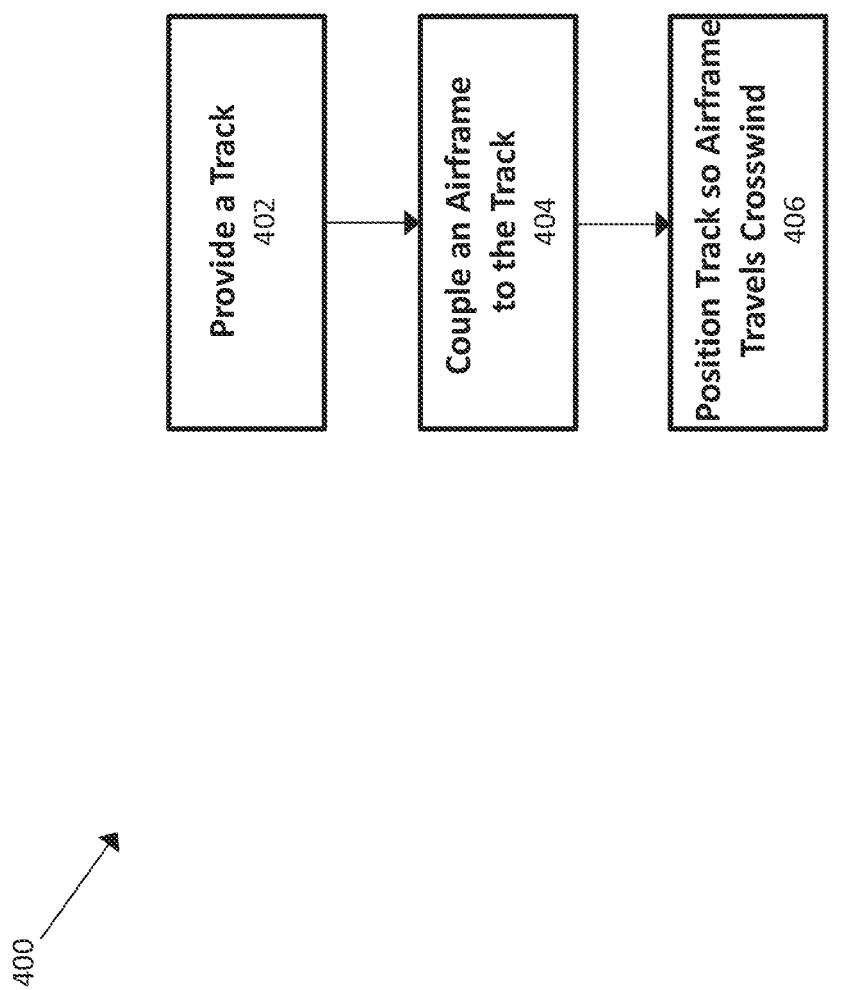

APPARATUS FOR EXTRACTING POWER FROM FLUID FLOW

CROSS-REFERENCE TO RELATED APPLICATIONS

This application is a continuation of U.S. application Ser. No. 16/673,879, which is a continuation of U.S. application Ser. No. 15/597,082 filed on May 16, 2017 issued on Nov. 5, 2019 as U.S. Pat. No. 10,465,654 which is a continuation of U.S. application Ser. No. 15/156,246 filed on May 16, 2016, issued on May 16, 2017 as U.S. Pat. No. 9,651,027, which is a continuation of Ser. No. 14/841,576 filed on Aug. 31, 2015, issued on May 17, 2016 as U.S. Pat. No. 9,341,161, which is a continuation of Ser. No. 14/618,885, filed on Feb. 10, 2015, issued on Sep. 8, 2015 as U.S. Pat. No. 9,126,683, which is a continuation-in-part of International Application PCT/US2015/012931, with an international filing date of Jan. 26, 2015, which claims the priority benefit of U.S. Pat. No. 8,950,710, filed on Jan. 31, 2014 and issued on Feb. 10, 2015. The contents of these applications are herein incorporated by reference in their entireties.

FIELD OF THE DISCLOSURE

This disclosure generally relates to renewable energy. More specifically, this disclosure describes apparatuses and methods for extracting power from fluid flow.

BACKGROUND OF THE INVENTION

Extracting power from fluid flow is a prominent source of renewable energy. Mainstream examples include wind power and hydropower.

Traditional systems for extracting power from fluid flow are primarily turbine-based. In a turbine, one or more blades are rotatable about a central point, which is rigidly attached to an anchor (typically a tower). The blades are placed within the flowing fluid, which induces a rotation of the blades, and the rotation is converted to electricity.

Turbines may suffer from a number of drawbacks. For example, the forces exerted on a turbine are proportional to the cube of the length of the turbine blades. As the turbine blades increase in size, destructive forces (the moment about a tower, for example) are cubed. By contrast, usable power is only squared.

This "square-cube" law places significant restrictions on the scale of turbines. Inevitably, the gain of additional power extracted from greater size is not offset by the cost of addressing an increase in destructive forces. For at least this reason, turbine scale is limited.

Other known solutions eliminate towers or other rigid anchors. Examples of such power extraction systems include airborne wind energy systems ("AWE"). Typically, these systems are aerodynamic bodies tethered to the ground (a kite, for example) which fly at altitudes above the height of wind turbines.

There are two main mechanisms for extracting power from an AWE's movement through air: on-board power generation and ground-based power generation. An example of the former includes a turbine on the kite which generates electricity in the same way as the turbines discussed above. An example of the latter includes a long tether attached to a drum, where movement of the kite unrolls the tether from the drum, which rotates the drum and a connected generator, thus converting wind power into electricity.

AWEs may also suffer from a number of drawbacks. For example, because the system requires a tether angled to the airborne object, the power extracted will be a function of the available power and the cosine of the tether angle. Thus, the power extracted may never equal the available power. In addition, the tether will create drag as it moves through the air, slowing the kite, and thus reducing the harvested power. Finally, high-flying AWEs are subject to aviation restrictions, which limit their geographic scope (due to no-fly zones, for example) and present regulatory hurdles for implementation.

SUMMARY

Examples of the disclosure are directed toward apparatuses and methods for extracting power from fluid flow that overcome the above-identified drawbacks. As an exemplary advantage, the scale of the apparatuses may not be limited by a square-cubed law. As another exemplary advantage, the apparatuses and methods may not be subject to tether drag and/or cosine losses. As another exemplary advantage, the apparatuses may not be classified as "airborne devices" for regulatory purposes.

In some examples, an apparatus for extracting power includes a track and an airfoil coupled to the track. The track includes first and second elongate sections, where the first elongate section is positioned above the second elongate section. The airfoil includes a pressure surface positioned between a suction surface and the track, and the airfoil is moveable in opposite directions when alternately coupled to the first elongate section and second elongate section.

By facing the suction surface toward the track, the track may be oriented so that the airfoil moves crosswind with respect to an atmospheric wind speed. This crosswind motion may advantageously allow the airfoil to travel at speeds greater than the speed of the atmospheric wind. Further, by positioning the first elongate section above the second elongate section, an airfoil traveling on either of the sections will directly receive the atmospheric wind; that is, the incident wind on an airfoil is not disturbed by airfoils on the other elongate section. This may allow for increased power extraction.

In some further examples, a bridle is coupled to the track and anchored to the ground. Bridling may beneficially allow for less structural support, reducing the cost of the power extraction apparatus.

Bridling may also beneficially allow for reductions in destructive forces on the apparatus. For example, three or more bridles may be distributed along an elongate section to reduce the moment on a length of the elongate section.

In some further examples, an airfoil is rolled at approximately 90−γ degrees to the horizon to offset forces from a bridle angle at γ degrees to the horizon.

In some examples, an airfoil has a first roll to the horizon when the airfoil is coupled to the first elongate section and a second, different roll to the horizon when the airfoil is coupled to the second elongate section.

In some examples, the track includes a terminal connecting the first and second elongate sections, where the airfoil decelerates when the airfoil transitions from the first elongate section to the terminal and accelerates when the airfoil transitions from the terminal to the second elongate section. This may eliminate high forces attendant with the change in direction. The deceleration of the airfoil may also be harvested as power.

In some examples, the track includes a terminal connecting the first and second elongate sections, wherein the airfoil is yawed as the airfoil travels along the terminal.

In some examples of the disclosure, a method of extracting power includes providing a track, positioning the track, coupling an airframe to the track, and harvesting power from an atmospheric wind through the movement of the airframe. As used herein, an airframe may include an airfoil, and may also include a fuselage and empennage, for example. An airframe may also simply be an airfoil. The track may include a first elongate section and a second elongate section lower than the first elongate section. The track may be positioned so that the airframe travels crosswind to an atmospheric wind.

Some further examples include attaching a bridle to the track and anchoring the bridle. Yet further examples include attaching at least three bridles to the first elongate section. In some examples, one of the bridles is angled at $\gamma$ degrees to a horizon and the method includes rolling the airframe at approximately $90-\gamma$ degrees to the horizon when coupled to the first elongate section.

In some examples, the method includes rolling the airframe at a first angle to a horizon when the airframe is coupled to the first elongate section and rolling the airframe at a second angle to the horizon when the airframe is coupled to the second elongate section, where the first angle is different from the second angle.

Some examples include coupling a terminal between the first and second elongate sections, where the airframe decelerates when the airframe transitions from the first elongate section to the terminal and accelerates when the airframe transitions from the terminal to the second elongate section.

In some examples, the method includes coupling a terminal between the first and second elongate sections and yawing the airframe as the airframe travels along the terminal.

In some examples of the disclosure, a power extraction system includes a track, a bridle angled at $\gamma$ degrees to a horizon and coupled to the track, and an airframe coupled to the track and rolled at approximately $90-\gamma$ degrees to the horizon.

In some examples of the disclosure, a method of extracting power includes providing a track, coupling an airframe to the track, positioning the track so that the airframe travels crosswind to an atmospheric wind, attaching a bridle to the track and anchoring the bridle so that it is angled at $\gamma$ degrees to a horizon, rolling the airframe at approximately $90-\gamma$ degrees to the horizon, and harvesting power from the atmospheric wind through the movement of the airframe.

BRIEF DESCRIPTION OF THE DRAWINGS

FIGS. 1A and 1B illustrate an exemplary power extraction apparatus according to examples of the disclosure. FIG. 1A illustrates the apparatus viewed in a direction of flow of an atmospheric wind. FIG. 1B illustrates the apparatus in a side, cut-away view.

FIG. 3A illustrates a side view of the bridling system and FIG. 3B illustrates a top view.

FIG. 4 illustrates a method of extracting power according to examples of the disclosure.

DETAILED DESCRIPTION

Figure 2A:
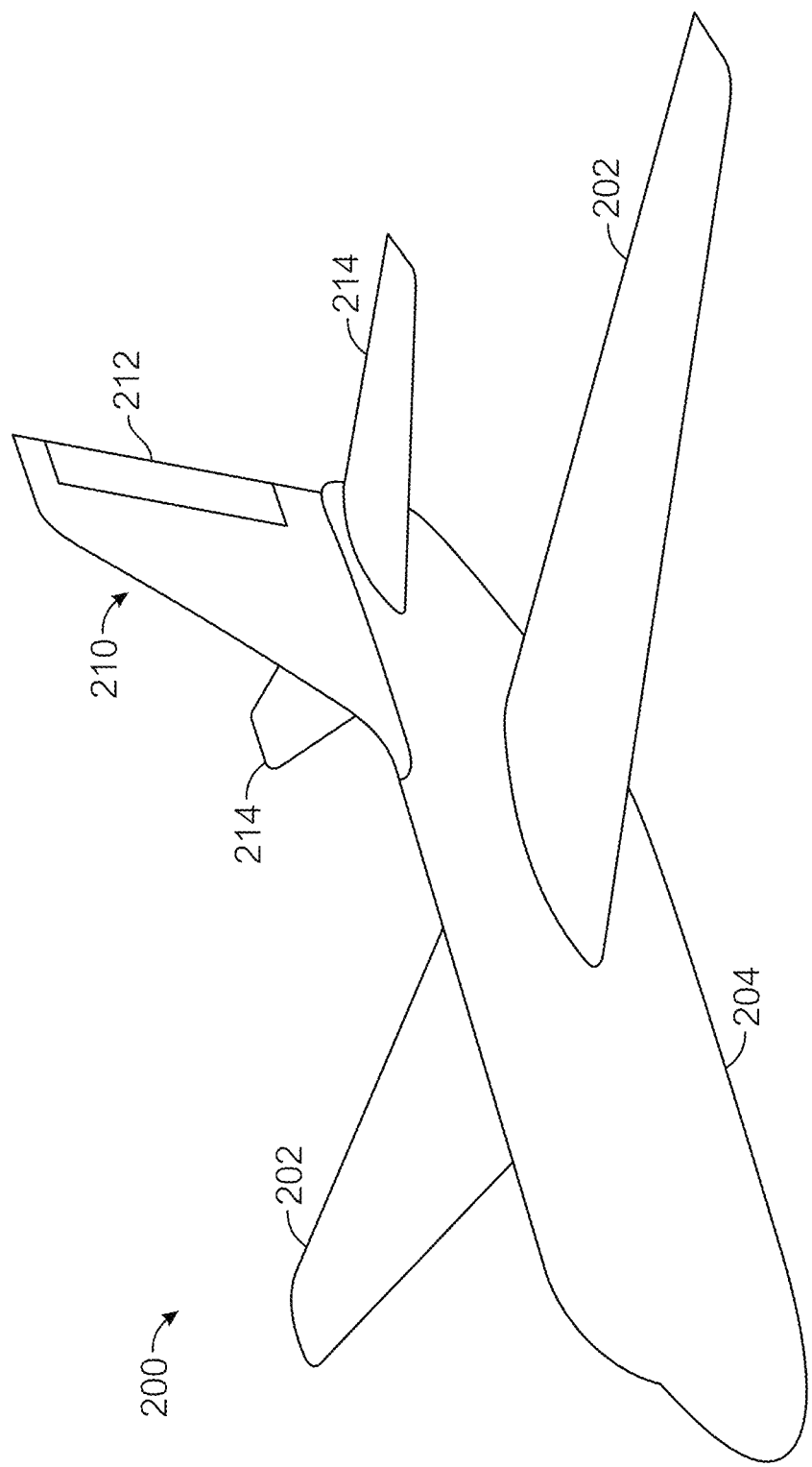
FIG. 2A illustrates an exemplary airframe according to examples of the disclosure.

In the following description of embodiments, reference is made to the accompanying drawings which form a part hereof, and in which it is shown by way of illustration specific embodiments which can be practiced. It is to be understood that other embodiments can be used and structural changes can be made without departing from the scope of the disclosed embodiments.

Examples of the disclosure are apparatuses that include a track and an airfoil coupled to the track. The track includes first and second elongate sections, where the first elongate section is positioned above the second elongate section. The airfoil includes a pressure surface lying between a suction surface and the track, and is moveable in opposite directions when alternately coupled to the first elongate section and second elongate section.

In some examples, methods of extracting power include providing a track, positioning the track, coupling an airframe to the track, and harvesting power from an atmospheric wind through the movement of the airframe. The track may include a first elongate section and a second elongate section lower than the first elongate section. The track may be positioned so that the airframe travels crosswind to the atmospheric wind.

FIGS. 1A and 1B illustrate an exemplary apparatus 100 for extracting power according to examples of the disclosure. FIG. 1A illustrates the apparatus viewed in a direction of flow of an atmospheric wind 124. FIG. 1B illustrates the apparatus in a side, cut-away view from the dashed line in FIG. 1A and looking toward end 108.

Apparatus 100 includes airframes 112 and 116 traveling on an upper elongate section 104 and a lower elongate section 106, respectively. Elongate sections 104 and 106 are components of track 102, which also includes terminals 108 and 110.

Airframes 112 and 116 are coupled to track 102 through carriers 114 and 118. The tracks are oriented so that the airframes travel crosswind with respect to the atmospheric wind 124. As used herein, an object may be understood to be traveling "crosswind" when the object's direction of travel is not aligned with a direction of an atmospheric wind. The atmospheric wind may be a prevailing wind, but need not be so limited.

In some examples, an object travels crosswind when its direction of travel is perpendicular to a direction of an atmospheric wind. In some examples, an object travels crosswind when its direction of travel is less than +/−45 degrees from a direction that is perpendicular to a direction of an atmospheric wind. In some examples, an object travels crosswind when its direction of travel is less than +/−20 degrees from a direction perpendicular to a direction of travel of an atmospheric wind.

In some examples, a maximum degree offset from a perpendicular direction of travel (in relation to the atmospheric wind) may be calculated by a limit on efficiency losses. In some further examples, an algorithm may be used to relate the degree offset ($\beta$) to the limit on efficiency loss (EL). Exemplary algorithms may include EL=(1−cos $\beta$) and EL=(1−cos$^2$ $\beta$). For a given limit on efficiency loss, the maximum offset angle can be determined.

By traveling crosswind, some examples described herein may be capable of traveling many times the atmospheric wind-speed. Additionally, by traveling along elongate sections, some embodiments may capture wind-power from areas many times the wing-span of the airframes. In some examples, that area of power extraction is the combined length of the elongate sections multiplied by a wing-span of the airframe. By contrast, wind-turbines are limited to harvesting wind-power from an area of a circle with a radius corresponding to the span of the turbine blades.

Some embodiments described herein may also provide benefits over AWEs. For example, because some embodiments do not use a tether, there are no cosine losses associated with harvesting wind power, nor energy losses due to tether drag. Furthermore, some examples may not be classified as "airborne devices," in contrast to AWEs, and so avoid the disadvantages of aviation regulations and restrictions.

Returning to FIGS. 1A and 1B, airframes 112 and 116 travel in opposite directions 120 and 122 on the upper and lower sections 104 and 106, respectively. The airframes change from the upper to the lower section along terminal 108 and from the lower to the upper section on terminal 110. Travel along a terminal also causes a change in direction of the airframes. While traveling along a path corresponding to the terminal, the airframe may be yawed to achieve a desired cross-wind orientation. In apparatus 100, an airframe is yawed 180 degrees (in a reference frame on the airframe) when traveling along a path corresponding to the terminal.

In addition, the change in direction results in the airframes traveling with a first roll to the horizon when traveling on the upper elongate section 104 and a second roll to the horizon when traveling on the lower elongate section 106. More specifically, when an airframe in FIGS. 1A and 1B travels in direction 120, the airframe is rolled 90 degrees to starboard (in an earth reference frame). When an airframe travels in direction 122, the airframe is rolled 90 degrees to port. By rolling at different angles when traveling in different directions, some examples of the disclosure allow the airframes to travel crosswind in both directions along the elongate sections and orient the airframe at an aerodynamically efficient angle of attack to a relative wind (as described further below).

Electricity may be captured from the motion of the airframes using any of a number of mechanisms (not shown) or a combination of those mechanisms. In some examples, a drag on the airframe may be converted to electricity. This may be achieved using an electric motor or generator, such as, for example, a propeller on the airframe. As the propeller turns, electricity is generated. Other examples may include a carriage with wheels (see, for example, elements 126 and 128 in FIG. 1) that run along the track. As the wheels turn, electricity is generated in an electric motor in the carriage. In some other examples, a cable or other conveyer belt is connected to the airframe and power is generated at the conveyer hub rather than on-board the airframe. Some examples may include a rack and pinion arrangement, wherein the pinion is attached to the airframe and the rack is in the elongate section. In further examples, there may be numerous cables, conveyor belts, rails, etc on the track so that different airframe speeds can be captured independently and/or some conveyor belts can be used to accelerate an airframe, when needed.

In some examples, electricity is captured through induction. An electric coil may be installed in the elongate section and a magnet installed on the airframe. As the airframe moves, the magnet induces an electric current in the coil which may be captured as electric power. Such an arrangement may beneficially reduce the number of mechanical parts, such as gears and/or cables. In some examples, the electric coil is wound around a core. Multiple coils may be used in a single elongate section, so that different airframe speeds can be captured independently and/or so that some coils may be used to accelerate an airframe.

In some examples, the airframes move independently of one another. The system may vary the speed of the airframes on different elongate sections and/or vary the number of airframes on each elongate section at any one time. In certain wind circumstances, it may be beneficial to have substantially different speeds, for example, to increase the power extracted from the wind. In some examples, low wind speeds may call for a relatively large number of airframes traveling relatively slowly and, by contrast, high wind speeds may call for a smaller number of airframes traveling relatively quickly. In some examples, a wind direction which is not perpendicular to the direction of travel of an airframe may call for different speeds and/or different number of airframes on the tracks. In some examples, the variations in speed and/or number are introduced manually and in others the variations are introduced automatically. In some other examples, a combination of manual and automatic controls introduce the variations.

To facilitate different speeds and/or different numbers of airframes, the airframes may collect at the terminals when not traveling on the elongate sections. The number of airframes on a section may be analogous to the solidity of a wind-turbine. As used herein, solidity can be understood to include a measure of the area that airframes or turbine blades sweep through (swept area) compared to the area occupied by the airframes or turbines blades, respectively. Unlike a wind-turbine, examples of the disclosure can change solidity from one wind condition to another and from one elongate section to another.

In some examples, airframes with different aerodynamic profiles may be used for different wind conditions. For airframes traveling in a direction aligned with an atmospheric wind, it may be advantageous to maximize surface area so that more power is captured by the airframe. On the other hand, airframes traveling crosswind may benefit from a relatively high lift/drag profile to increase lift (and thereby increase crosswind speed). Airframes may be stored in a corral and changed in response to the wind conditions at a given time.

Such corrals at the end of elongate sections may also be used to change the ratio of the number of airframes traveling in one direction. For example, an apparatus with three or more elongate sections may provide for a different number of airframes traveling in one direction. Such an arrangement may be advantageous when wind conditions favor airframe travel in one direction over the other. For example, when airframes travel in a direction aligned with an atmospheric wind, it may be advantageous to return the airframes (i.e., in the upwind direction) at a high speed. Resistance (and thus power supplied) to upwind travel may be reduced by utilizing a low drag profile. By contrast, the downwind speed may be relatively slow. Accordingly, for three or more elongate sections, it may be beneficial to allocate more elongate sections to downwind travel. The speed of the upwind airframes may be chosen so that the airframes are replenished at the upwind corral at the rate needed to supply the downwind travel.

The corrals may be a sub-section of the terminals, or replace the terminals. The corrals may include auxiliary rails, similar to siding for a train. The airframes may be staged in the auxiliary rail and introduced into the elongate sections as needed. A switch (manual or automatic) may guide the airframes into the corrals as necessary.

The track may be supported on either end by towers. As used herein, a track can be understood to include the elongate sections and terminals that comprise a closed loop. The towers can take any size or shape sufficient to support the track. The towers may be positioned at the end of each terminal, or may be positioned at inward points on the elongate section/track. In one example, a number of tracks are arranged side by side, each attached to two towers (similar to power lines attached to utility poles). In this way, multiple tracks can be supported and an individual track can be taken out of service for maintenance or other issues, without disturbing the power extraction of other tracks. In some examples, the elongate sections may be lengthened and supported using multiple towers. In these examples, lengthening the sections (rather than providing multiple tracks) may increase the efficiency of the system because the number of terminals is reduced (thus overall energy loss at terminals is reduced).

In some examples, multiple tracks are stacked on top of each other. In these examples, the airframes may travel in contra-rotating directions on track pairs, balancing twisting moments that may be caused by the rotation of the airframes on each track and/or the acceleration of the airframes at the terminals.

In some examples, elongate sections and/or whole tracks are arranged back-to-back. In some examples, tracks are arranged at 90 degrees to one another, thereby allowing the airframes to travel crosswind for a variety of incident atmospheric wind directions. In other examples, the tracks are positioned at other relative angles between 0 and 90 degrees, including 15, 30, 45, 60, and 75 degrees.

In some examples, elongate sections are arranged in a lattice. For example, rows of elongate sections may run east-west and columns may run north-south. When viewed from above, the elongate sections may depict a checker board pattern, with the ground representing the "squares" of the checker board. This arrangement allows for power extraction regardless of the orientation of an atmospheric wind. In some examples, the elongate sections may be oriented in multiple, overlaid, equilateral triangles. This may allow for increased power extraction at a variety of atmospheric wind orientations and may also allow the elongate sections to act as tie-rods. The elongate sections may share towers. Similarly, the elongate sections may share airframes which are transferred between elongate section, depending on the orientation of the atmospheric wind. Elongate sections in different orientations may alternate elevation. For example, if each north-south and east-west arrangement has four elongate sections, then the north-south arrangements may be positioned at 3, 9, 15, and 21 feet, while the east-west arrangements may be positioned at 6, 12, 18, and 24 feet. This spacing would allow airframes with wingspan of less than 6 feet to travel on any of the elongate sections without hitting another elongate section.

In some examples, one or more tracks are moveable relative to the ground or other reference point. For example, one tower associated with the tracks may be moveable and the other fixed so that the track pivots about the fixed tower. The moveable tower may be on wheels and connected to a motor for transport. In this way, some examples may be able to vary the angular offset of the airframes' travel to the incident atmospheric wind direction. Also, some examples with moveable tracks may be able to reorient to a desired angular offset for a variety of atmospheric wind directions.

FIG. 2A illustrates an exemplary airframe 200 according to examples of the disclosure. Airframe 200 includes wings 202, fuselage 204, and empennage 210. Empennage 210 includes a vertical stabilizer 212 and horizontal stabilizers 214.

As will be readily appreciated, airframe 200 is offered as an example and numerous variations could be employed without deviating from the scope of this disclosure. For example, some airframes may include only a horizontal stabilizer or a vertical stabilizer. In some embodiments, an airframe does not include an empennage.

Figure 2B:
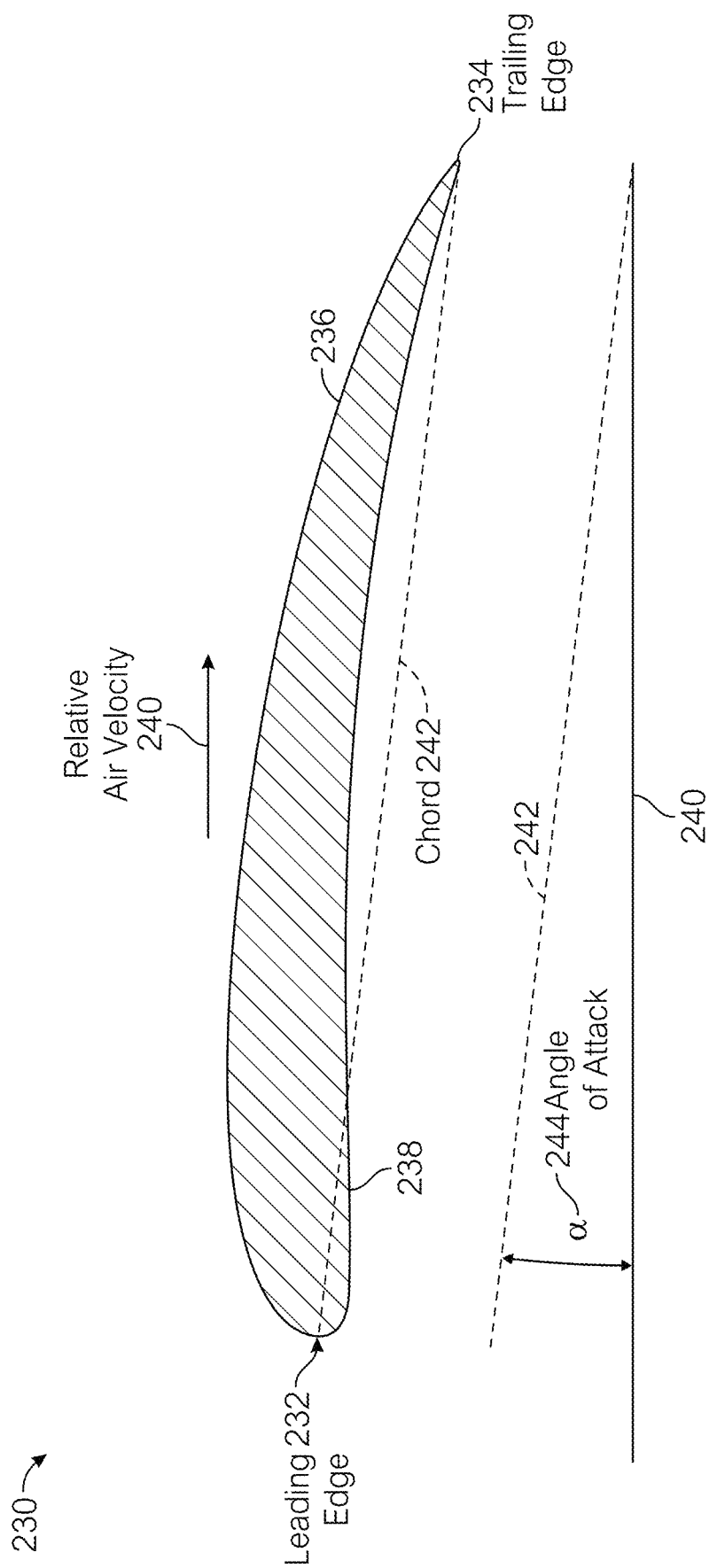
FIG. 2B illustrates a cross-section of an exemplary airfoil according to examples of the disclosure.

FIG. 2B illustrates an exemplary airfoil 230 according to examples of the disclosure. Airfoil 230 may be coupled to a track directly, or may be part of a larger airframe. In some examples, airfoil 230 may be the cross-section of wings 202 described above with respect to FIG. 2A.

Airfoil 230 depicts an aerodynamically efficient shape providing a useful lift/drag coefficient. Airfoil 230 includes a leading edge 232, a trailing edge 234, suction surface 236, and pressure surface 238. As relative wind 240 moves past airfoil 230, the shape induces an upward force (as viewed in FIG. 2B) on the airfoil. The force acts on the airfoil in a direction from the pressure side toward the suction side.

As used herein, an airfoil can be understood to be any object, or cross-section of an object, that provides a dynamic force in fluid flow. These include, without limitation, wings, sails, and turbine blades. An airfoil may be a part of a larger body, with additional components. For example, an airframe may include not only an airfoil, but also include a fuselage and empennage, such as described above with respect to FIG. 2A. In some examples, the airframe may simply be an airfoil.

When an airfoil is designed with a pressure surface and a suction surface, the airfoil may be oriented on a section of a track so that the pressure surface is positioned between the track and the suction surface. This arrangement may enable the airfoil to move crosswind at greater speed.

Chord 242 is an imaginary straight line joining the leading edge 232 and the trailing edge 234. The airfoil is oriented at angle of attack a (244), which can be understood to be the angle between chord 238 and the direction of the relative wind 238.

Figure 2C:
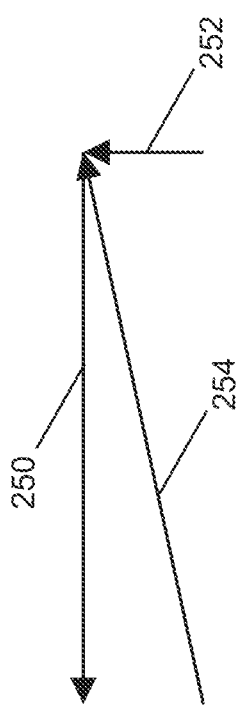
FIG. 2C illustrates an exemplary relative wind velocity in accordance with one example of an object traveling crosswind.

As used herein, the term "relative wind" can be understood to be the vector sum of the created wind velocity and the atmospheric wind velocity. FIG. 2C illustrates an exemplary relative wind velocity 254 in accordance with one example of an object (not shown) moving crosswind. Vector 250 represents the ground velocity of the object and vector 252 represents the atmospheric wind velocity.

For purposes of explaining the relative wind velocity 254, the "created wind" must be first understood. The created wind velocity is simply the magnitude of the ground velocity 250, but reversed in direction. To calculate the relative wind velocity, the created wind velocity and atmospheric wind velocity 252 are vector-summed to result in the relative wind velocity 254.

Returning to FIG. 2B, various angles of attack may be employed. In some examples, the angle of attack is calculated as a function of a desired lift/drag ratio. For example, if a predetermined lift/drag requires a 6 degree angle of attack, then the pitch of the aircraft will be altered based on the atmospheric wind and ground speed. If the atmospheric wind speed is 8 m/s and the ground speed is 50 m/s, then the relative wind speed will be at 9.09 degrees ($\tan^{-1}$ (8/50)) to the track. To achieve an angle of attack to the relative wind of 6 degrees, the airfoil will be angled at −3 degrees to the track.

In general, a pitch angle relative to the track can be determined with the atmospheric speed, the ground speed, and a desired angle of attack. First, the angle of the relative wind to the track is determined from atmospheric wind speed and the ground speed. The angle of the relative wind is then subtracted from the desired angle of attack, to result in the desired pitch angle of the airframe relative to the track.

The angle of attack may be varied for different wind conditions. That is, considerations such as efficient power extraction and limited structural integrity may determine a desired angle of attack. The angle of attack may be controlled via the empennage (i.e., via elevators on the horizontal stabilizers), or mechanically by moving/reorienting the coupling between the track and airframe.

In some examples, the angle of attack need not be the same when traveling in different directions on elongate sections. This may account for an atmospheric wind that is not perpendicular to the elongate sections.

An empennage may be used to implement a gust safety factor, passively and/or automatically. A gust increases the angle of attack. The tail may be designed so that a gust increases the lift of the tail. When the tail "lifts" (relative to the wind), the angle of attack of the airframe decreases, and the airframe's attitude returns to within a predetermined range.

In some examples, the airframe can be selectively oriented to have little or no force generation. This may be beneficial for addressing excessive winds or misdirected winds, and for downtime such as maintenance operations. By setting roll angle to zero (relative to the horizon) and pitch angle to zero (or zero lift Angle of Attack), and allowing the airframe to freely yaw, the airframe will exert little force on a track.

Figure 3B:
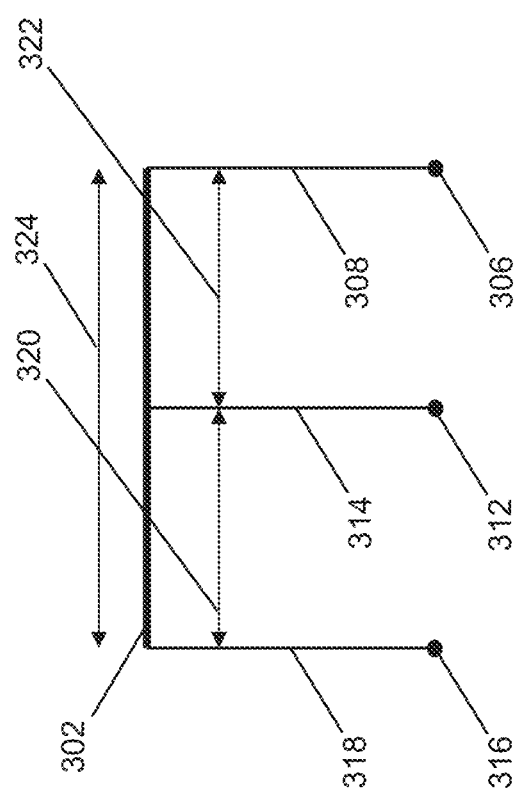
FIGS. 3A and 3B illustrate an exemplary bridling system according to examples of the disclosure.
Figure 3A:
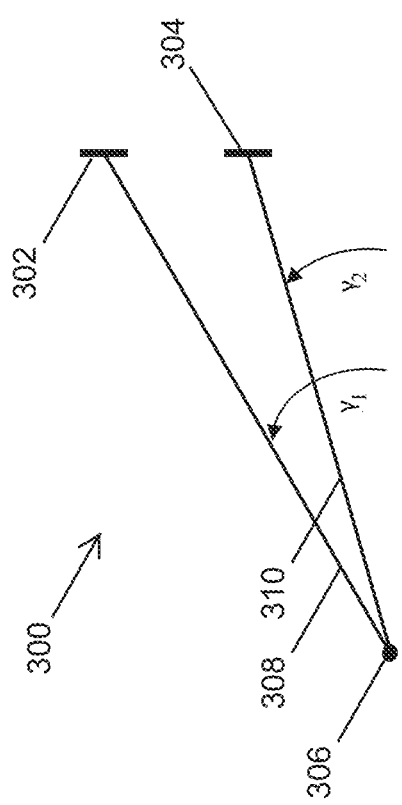

In some examples, an electricity extraction apparatus is anchored using one or more bridles. FIGS. 3A and 3B illustrate an exemplary bridling system according to examples of the disclosure. FIG. 3A illustrates a side view of bridling system 300 and FIG. 3B illustrates a top view.

Bridling system 300 includes bridles 308 and 310 coupled to upper elongate section 302 and lower elongate section 304, respectively. In some examples, elongate sections 302 and 304 may be the upper and lower elongate sections described above with respect to FIGS. 1A and 1B.

Bridles 308 and 310 are co-anchored at anchor point 306. In some examples, two bridles may be anchored at different anchor points. Bridles 308 and 310 define angles $\gamma_1$ and $\gamma_2$ with respect to a reference line containing anchor point 306. In some examples, the reference line may be the level of the ground, the horizon, or other physical reference.

FIG. 3B illustrates the bridling system from above, depicting multiple bridles attached to each elongate section. Elongate section 302 is the only elongate section visible in FIG. 3B due to the vertical alignment of the elongate sections in this example.

As can be seen in FIG. 3B, bridling system 300 includes bridles 308, 314, and 318 distributed across the elongate section. Each bridle is attached to the elongate section 302 at anchor points 306, 312, and 316 respectively. The plurality of bridles divides the length 324 of the elongate section 302 into sub-lengths 320 and 322.

As noted above, elongate section 302 is obscuring elongate section 304 because of the vantage point of FIG. 3B. For the same reason, only upper bridles 308, 314, and 318 are viewable in FIG. 3B. System 300 also includes at least lower bridle 310 obscured by upper bridle 308 and may include additional bridles obscured by upper bridles 314 and 318.

The bridling systems of this disclosure may beneficially distribute the downwind forces, reducing their destructive effect on the power extraction apparatus. In a wind-turbine, all forces are concentrated at the hub (or central point), which causes large moments on the tower. For at least this reason, the tower in a wind-turbine may be very large. In the apparatuses described herein, the downwind forces are distributed on the multiple airframes. Further, the bridling distributes the downwind forces on the sub-lengths so that any one sub-length experiences a substantially reduced moment.

Although sub-lengths 320 and 322 are approximately equal in FIG. 3B, other examples may include different sub-lengths. Also, although three bridles are illustrated in FIG. 3B, other examples may include any number of bridles.

Each sub-length may be chosen to account for a variety of considerations. For example, the wing area of the airframe, the speed of the airframe, strength of the rail, etc. In some examples, the sub-lengths are determined as a function of one or more of the density of the fluid, area of the airframe, the speed of the carrier on the track, airframe lift coefficient, and the modulus of elasticity of the track. In some examples, the sub-lengths are approximately 2.5 meters each. In some examples, the number of bridles is determined by the number of airframes traveling on an elongate section at one time and may be chosen so that there are more sub-lengths than traveling airframes at one time.

In some examples, a bridling system is chosen to suit a surrounding landscape and specific implementation factors. In some examples, each bridle is anchored individually and runs straight from the ground to the track. In other examples, the bridle is configured similarly to a cable-stayed bridge: the bridles attach to one (or more) anchor points, and then fan out to the rail attachment points. In another example, the bridles are configured similarly to a suspension bridge: a suspension cable forms an arc between two attachment points and the individual bridles are attached to this arc. In yet another example, the bridle system includes a flying anchor point. In this example, a guy wire/tether goes up from the ground to a central "flying anchor." Bridles attach to this "flying anchor" and fan out to the track. In another example, a helper pylon is installed between the main anchor point and the track. A guy wire then goes from the ground to the helper pylon at a large angle, and then is redirected (via individual bridles or grouped anchors) to the track. By redirecting the bridle, the helper pylon absorbs some of the downward forces, allowing total bridle length to be shorter (or effective angle to be lower) thereby reducing cosine losses due to elevation.

In some examples, the bridles may have different lengths for upper sections and lower sections. This may cause the track to be rolled at a desired roll angle, which then may force the airframe to a desired roll angle (see discussion of roll angle below).

In some embodiments, an upper elongate section is rigidly attached to a lower elongate section at bridle attachment points. Again, differential bridle lengths may be used. This arrangement may also force the elongate sections to the proper angle. In comparison to the examples in the previous paragraph, this configuration accentuates line lengths slightly (by increasing separation), allowing for more practical control.

Some examples may include dual direction flying buttress when various atmospheric wind directions are to be harvested. In these examples, an upside down V may be placed between "upwind" and "downwind" sections. The sections are rigidly attached to this buttress, and the carriers/airframes are attached to the sections such that they can only slide. Two upwind bridles and two downwind bridles are attached to the buttress in such a way that they may avoid all potential orientations of the airframe. In this way, it is possible to construct a dual direction apparatus which also maintains the rails at the proper roll angle.

Figure 3C:
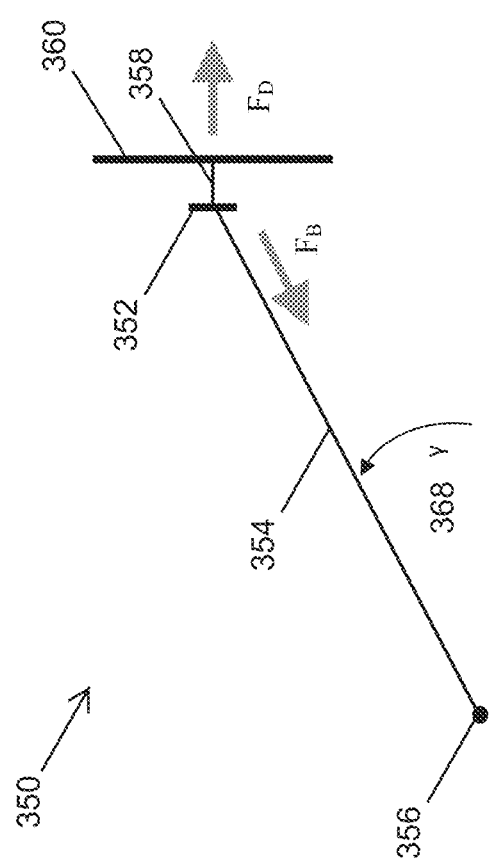
FIG. 3C illustrates the forces on a power extraction system when an airframe is rolled 90 degrees to the horizontal according to examples of the disclosure.

Bridling may introduce additional forces on the track. For example, FIG. 3C illustrates the forces on power extraction system 350 when airframe 360 is rolled 90 degrees to the horizontal according to examples of the disclosure. Airframe 360 produces forces in the crosswind direction (not shown) which is harvested as power. Airframe 360 is coupled to elongate section 352 via carrier 358 and produces downwind force (FD) on elongate section 352.

The downwind force (FD) is balanced by bridle 354. However, bridle 354 is oriented at angle γ and so the bridle force (FB) acts at angle of 90−γ from the horizontal. As a result, the bridle force (FB) has both a horizontal component (for balancing the down-wind force of the airframe) and a vertical component. This vertical component, which has no counter balance in the example of FIG. 3C, tends to pull the track downwards, which may put stress on the track.

In some embodiments, a roll is introduced into the airframe that is less than 90 degrees from the horizontal. The roll may orient the airframe with respect to the rail and bridle so that the forces acting on the airframe are approximately in the direction of the bridle.

Figure 3D:
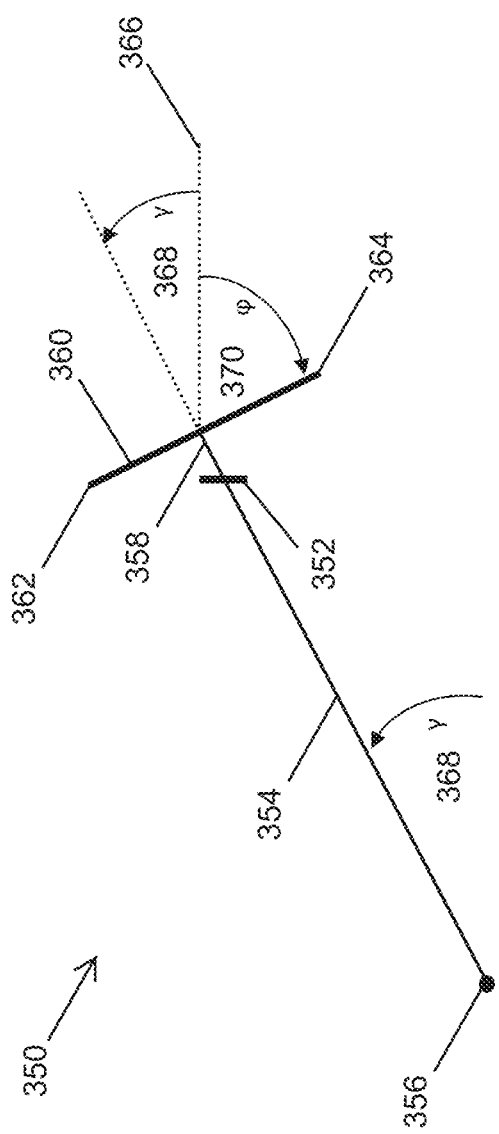
FIG. 3D illustrates a side view of an exemplary roll introduced on an airframe according to examples of the disclosure.

FIG. 3D illustrates a side view of an exemplary roll introduced on airframe 360 according to examples of the disclosure. As above, bridle 354 is coupled to a ground surface at anchor point 356 and bridle 354 is angled at γ to the horizontal. To balance the bridle force, airframe 360 is rolled at angle γ to the horizontal (note that the horizontal is referred to here, but any reference line could be used).

In the example of FIG. 3D, airframe 360 is rolled at angle φ=90−γ. In some embodiments, γ may not equal 90−γ, but is rolled a number of degrees away from 90−γ γ. In some examples, a maximum degree offset from 90−γ may be calculated by a limit on efficiency losses. In some further examples, an algorithm may be used to relate the degree offset (γ) to the limit on efficiency loss (EL). Exemplary algorithms may include EL=(1−cos γ). For a given limit on efficiency loss, the maximum offset angle can be determined. The maximum degree offset may also be limited by the structure of the track. As the angle between the airframe roll and bridle elevation increases, the stress on the track increases. For a given material, a maximum offset may be calculated to keep stress on the track within a predetermined limit.

Airframe 360 is coupled to elongate section 352 via carrier 358. Carrier 358 may be rotatable with respect to elongate section 352 so that airframe 360 can change its angle with respect to elongate section 352. Some carriers may include a servo to orient the airframe to the desired roll angle, as discussed in more detail below.

In some examples, an upper elongate section and lower elongate section may have different bridle angles (see FIG. 3A) and thus different rolls on the airframes. As the airframe travels along the terminal, a change in roll must be introduced so that the airframe can assume the correct roll angle for the elongate section. This may be achieved by yawing the airframe at 180 degrees while also rolling the airframe a desired amount as the airframe travels along the path corresponding to the terminal. In some variations, the magnitude of this roll will be the sum of the bridle angles.

In some embodiments, the roll of the airframe may be measured and adjusted accordingly. In some examples, the roll may be measured using sensors attached to the airframe, or via an inertial navigation system (such as a gyroscope, accelerometer, and gps) integrated via a sensor fusion algorithm such as a kalman filter. The airframe's position may also be sensed via RFID or other near field communications, with those outputs utilized in the sensor fusion algorithm. In some embodiments, the roll of the airframe is measured using mechanical sensors attached to the carriage.

There are a number of mechanisms by which the roll of the airframe can be controlled. In some examples, the airframe is equipped with ailerons on its wings. By manipulating the ailerons, the roll of the airframe can be controlled. In some embodiments, the elongate section may introduce a natural roll to the airframe. For example, an elongate section may be constructed of flexible material that naturally flexes to roll the airframe and balance the bridle forces. In some embodiments, a track is rotatably attached to supporting towers. In this way, the track may naturally reorient to an angle to the horizontal that corresponds to an appropriate roll in the airframe. In some examples, the airframe attachment to the carrier may be offset laterally from a center of pressure to induce a roll. When the desired roll is achieved, the attachment may be reset to the center of pressure. Some embodiments control roll by tethering the wing tips differentially to the carrier. For example, a starboard tether may be lengthened and a port tether shortened, resulting in a roll toward port.

Although the above description focused primarily on balancing bridle forces with the aerodynamic forces on the airframe when determining roll angle, other forces may also be considered. These forces may include the force of gravity on the airframe and carrier, the force of gravity on the elongate section, the force of gravity on support towers and buttresses, the force of drag on the elongate section, and any buoyancy of connected objects (such as in a water embodiment or airborne embodiment). In some embodiments, the elongate section is aerodynamically shaped to reduce drag.

In some airborne examples, the gravitational force induced by the weight of the apparatus may be balanced by a lift induced by the airframes. Such an apparatus may first be raised to a desired altitude using a crane, aircraft, or buoyancy device, for example. Once at the appropriate altitude, wind may be utilized to change or maintain the altitude. This may beneficially allow airborne embodiments to capture high velocity wind vectors at high altitudes.

In some examples, multiple bridles may be attached to a single point on the track and "fan out" so that each bridle creates a different angle to the track (when viewed from above). This arrangement may beneficially offset aerodynamic forces for a variety of relative wind directions.

In some examples, the angles between the track and the outer-most bridles and the angles between bridle pairs may be equal. In further examples, the equal angles may each be 180 degrees divided by one plus the number of bridles (e.g., 180/(n+1), where n is the number of bridles). For example, for two bridles attached to the same point, the angle between the bridles may be 60 degrees and the angle between each bridle and the track may be 60 degrees. In other examples, the angles between the track and the outer-most bridles and the angles between bridle pairs may not be equal.

By attaching multiple-bridles to the same point on the track, and arranging the bridles at different angles to the track, some examples may improve aerodynamic force offset for various atmospheric wind speeds and airframe wind speeds. For example, if an airframe is traveling relatively quickly on the track, then the relative wind may be approximately parallel to the orientation of an elongate section (resulting in the force being perpendicular to the elongate section). In such a scenario, multiple bridles connected to a single point, and at different angles, on the elongate section will allow the force to be distributed between the bridles.

By contrast, if the airframe speed is slower, the relative wind may not be parallel to the elongate section (and so the force may not be perpendicular to the elongate section). In such a scenario, the aerodynamic force may be more aligned with one of the bridles and that bridle can offset the dynamic force. Compare this to a single bridle embodiment, where a non-perpendicular force (to the elongate section) is only partly balanced by the bridle.

Multiple bridles at different angles may allow for optimization across various wind conditions. For example a relatively slow atmospheric wind may call for high airframe speed and low angle of attack in an "upwind" direction, but a low airframe speed and high angle of attack in a "downwind" direction.

Although the above description of bridling and induced rolling focuses primarily on systems with two elongate sections, one of ordinary skill in the art will readily appreciate that the concepts can be applied to systems with a single elongate section or systems with multiple elongate sections. One of ordinary skill in the art will also readily appreciate that the bridling and induced roll concepts described above can be applied to non-elongate sections. The description above applies to any arrangement of a system including a bridle and an airframe, where the airframe can be rolled to offset forces in the bridle.

Turning now to the terminals that connect the elongate sections, it will be appreciated that the airframe exerts a centrifugal force on the track while changing direction. This centrifugal force may require reinforcement of the track at the terminals.

In addition to the centrifugal forces at the terminals, aerodynamic forces are also introduced. Specifically, the airframe may yaw at the terminal. This will result in the outer wing tip having a higher ground speed then the inner wing tip. Thus, the outer wing tip has a different angle of attack. Therefore, the apparent angle of attack and apparent windspeed are different on the inner side and the outer side. This may result in more lift on the outer wing than the inner wing.

In some embodiments, the forces and positioning needs at the terminals are addressed by reducing the absolute velocity of the airframe at the terminals. This deceleration can be harvested as power.

In some embodiments, the airframe is rolled at the terminals to counter forces created by the yaw. For example, if the outer ailerons are raised and the inner ailerons are lowered, the outer lift will be decreased and the inner lift increased. This may serve to even out the lift distribution and reduce the rolling moment which must be absorbed by the structure.

Although the description of embodiments above was offered primarily with respect to tracks anchored to ground, the disclosure is not so limited. In some examples, the track may be airborne or may be offshore.

In addition, although single wing airframes were primarily discussed above, some embodiments may include multi-wing aircrafts such as bi-planes or other multiplane airframes. The wings may be stacked or arranged one behind another, or a combination of both.

FIG. 4 illustrates method 400 of extracting power according to examples of the disclosure. Method 400 includes providing a track 402. The track may include a first elongate section and a second elongate section lower than the first elongate section. Method 400 includes coupling an airframe to the track 404 so that the airframe travels crosswind to an atmospheric wind.

In some examples, the method of extracting power may also include attaching a bridle to the first elongate section. The bridle may be anchored and angled at $\gamma$ degrees to a horizon. The method may also include rolling the airframe at approximately 90–$\gamma$ degrees to the horizon when coupled to the first elongate section. Some examples may include more than one bridle.

In some examples, the method may also include rolling the airframe at a first angle to a horizon when the airframe is coupled to the first elongate section and rolling the airframe at a second angle to the horizon when the airframe is coupled to the second elongate section, and wherein the first angle is different from the second angle.

Some methods may include coupling a terminal between the first and second elongate sections, wherein the airframe decelerates when the airframe transitions from the first elongate section to the terminal, and wherein the airframe accelerates when the airframe transitions from the terminal to the second elongate section. In some examples, a method may include coupling a terminal between the first and second elongate sections and yawing the airframe as it travels along the terminal.

In some embodiments, the length of an elongate section is at least 25 times a radius of a path from one elongate section to another. An example of such a path is a terminal discussed above. In some embodiments, the length of an elongate section is a different multiple of the radius of a path from one elongate section to another, such as a number greater than 50, 75, and 100.

In some embodiments, the radius of a path from one elongate section to another is 5 multiples of one half the wingspan of an airfoil. In some embodiments, the ratio of a width of an elongate section to the wingspan of the airfoil is more than 1:100. In some embodiments, the width of an elongate section is in the range of 0.025 to 0.15 meters. In some embodiments, the length of an elongate section is in the range of 33 meters to thousands of meters. In some embodiments, an airfoil has a 6-meter wingspan, an elongate section is 0.06 meters wide, and the elongate section is 800 meters long. In some embodiments, the elongate section is supported midway by towers.

In some embodiments, an airfoil has greater than 10 meters of clearance above ground level. For an airfoil with a 3 meter wingspan, the associated elongate section is elevated more than 13 meters above ground level. One of skill in the art will recognize that different wingspans will have different elevations. In the case of two elongate sections arranged above each other, the upper elongate section will need to be further elevated so that airfoils do not collide while moving in alternate directions. A gap may be also added. In some embodiments, elongate sections are elevated much higher, 150 meters for example, to take advantage of stronger winds at higher altitudes.

In some embodiments, the elongate sections are not positioned one above the other. In some such embodiments, a track includes a first elongate section downwind of a second elongate section (in one non-limiting example, the first and second elongate sections lie on a horizontal plane). The airfoil is coupled to the track and is moveable in opposite directions when alternately coupled to the first elongate section and second elongate section. In some further embodiments, a bridle system couples at least one of the first and second elongate sections to an anchor. A power generator is used to harvest power from an atmospheric wind.

In some embodiments where the elongate sections are not positioned one above the other, an airfoil moving along an upwind elongate section creates a wake that might interfere with an airfoil moving on a downwind elongate section. In some such embodiments, a distance between the first and second elongate section is chosen so the wake from an airfoil on the upwind elongate section does not substantially reduce the aerodynamic forces on the airfoil on the downwind elongate section.

In some embodiments where the elongate sections are not positioned one above the other, the airfoils may travel from the first elongate section to a second elongate section along a connecting section. In some such embodiments, the connecting sections are linear so that the track comprises a rectangle, when viewed from above, with rounded paths connecting the elongate sections and the connecting sections.

In some embodiments where the elongate sections are not positioned one above the other, the bridling system that couples at least one of the first and second elongate sections to an anchor includes bridling features discussed elsewhere herein. For example, the bridling features discussed in Paragraphs 0013-15, 20, 24, 25, 73-90, 92, 94, 95, 97-101, and 109. In some embodiments where the elongate sections are not positioned one above the other, a track (comprising the elongate sections and the connecting sections) is elevated above ground level.

In some embodiments where the elongate sections are not positioned one above the other, the airfoil is primarily pitched 180 degrees (through any combination of roll, pitch, and yaw). In some embodiments, this 180 degree pitch may be achieved in two 90 degree steps, so that two crosswind elongate sections maintain sufficient wake clearance. Contemplated herein are various geometries (triangles, hexagons, etc) such that one circuit of the track comprises a total pitch of 360 degrees (in a stepwise fashion, for example) to minimize downwind turbulence effects. The discussion herein of the radius of a path between two elongate sections also applies to embodiments where the elongate sections are not positioned one above the other.

In some embodiments where the elongate sections are not positioned one above the other, power is generated on cross-wind elongate sections via aerodynamic forces. On a downwind connecting section, power is also generated. On an upwind connecting section, the airfoil can be oriented to reduce drag, and the electro-mechanical power system consumes power to bring the airfoil to a cross-wind elongate section.

As noted above, the disclosure is not limited to wind-power. Some examples may include other gases or fluids. Exemplary hydropower embodiments may include a river installation or a tidal power installation. In some other examples, the electricity extraction apparatus may be attached to buoyant devices, which may create lift. By manipulation of roll angle (either through structure or active controls), the apparatus can be maintained at a desired depth or height to increase energy capture, for example. When used herein, terms that may suggest a specific application (such as crosswind and atmospheric wind) should be understood to have analogous terms in other fluid flows.

Further, as used herein, the term "elongate section" may be understood to be any structure to which an airframe can be coupled and travel crosswind for distances many times the size of the airframe. An elongate section may not necessarily be linear and may include curves or other non-linear aspects. In some embodiments, an apparatus or method for extracting power may include a single elongate section or multiple elongate sections arranged horizontally, rather than the vertical orientation described herein.

Although the disclosed embodiments have been fully described with reference to the accompanying drawings, it is to be noted that various changes and modifications will become apparent to those skilled in the art. Such changes and modifications are to be understood as being included within the scope of the disclosed embodiments as defined by the appended claims.

What is claimed is:

1. An apparatus for extracting power comprising:
a first elongate section;
a second elongate section, wherein the first elongate section is positioned above the second elongate section;
an airfoil alternatively coupled to the elongate sections, wherein the airfoil comprises a suction surface and a pressure surface, wherein the airfoil is alternatively coupled to the elongate sections so that the suction surface lies between the pressure surface and the elongate sections, wherein the airfoil is moveable in opposite directions when alternately coupled to the first elongate section and second elongate section;
a bridle system coupling at least one of the first and second elongate sections to an anchor; and
a power generator to harvest power from an atmospheric wind through the movement of the airfoil.

2. The apparatus of claim 1, wherein
a terminal connects the first elongate section to the second elongate section, wherein
a distance from a start to an end of the terminal is shorter than a distance from a start to an end of the first elongate section and shorter than a distance from a start to an end of the second elongate section.

3. The apparatus of claim 1, further comprising:
a terminal connecting the first and second elongate sections, wherein the airfoil pitches as it travels along the terminal.

4. The apparatus of claim 1, further comprising:
a terminal connecting the first and second sections; and
multiple towers, wherein each tower is coupled to at least one of the first and second sections, and wherein the airfoil pitches or yaws as it travels along the terminal.

5. The apparatus of claim 1, further comprising
a terminal connecting the first and second sections, wherein the first and second sections are held in tension, and wherein
the first and second sections are elevated more than 13 meters above ground level or the airfoil has greater than 10 meters of clearance above ground level.

6. A method of extracting power comprising:
providing a first elongate section;
providing a second elongate section lower than the first elongate section; and
coupling an airframe to the elongate sections, wherein the airframe comprises a suction surface and a pressure surface, and wherein the airframe is alternately coupled to the elongate sections so that the suction surface lies between the pressure surface and the elongate sections;
positioning the elongate sections so that the airframe travels crosswind to an atmospheric wind;
attaching a bridle system to at least one of the first and second elongate sections; and
anchoring the bridle system.

7. The method of claim 6, the method further comprising:
providing a terminal connecting the first and second elongate sections;
coupling the airfoil to the elongate sections and the terminal such that the airfoil pitches as it travels along the terminal;
and
harvesting power from the atmospheric wind through the movement of the airfoil.

8. The method of claim 6, the method further comprising:
providing a terminal connecting the first and second sections, wherein a distance from a start to an end of the terminal is shorter than a distance from a start to an end of the first elongate section and shorter than a distance from a start to an end of the second elongate section.

9. The method of claim 6, the method further comprising:
providing a terminal connecting the first and second sections, wherein coupling the airframe to the elongate sections comprises coupling the airfoil to the first section, second section, and terminal such that the airfoil pitches or yaws as it travels along the terminal;
providing multiple towers; and
coupling each tower to at least one of the first and second sections.

10. The method of claim 6, the method further comprising:
providing a terminal connecting the first and second sections, wherein coupling the airfoil to the first and second section comprises coupling the airfoil such that it travels linearly along the first and second sections;
providing towers;
coupling each of the towers to at least one of the first and second sections;
and
automatically changing a total area of the airfoils in accordance with changing wind conditions.

11. An apparatus for extracting power comprising:
a first elongate section;
a second elongate section, wherein the first elongate section is positioned above the second elongate section;
an airfoil alternatively coupled to the elongate sections, wherein the airfoil comprises a suction surface and a pressure surface, wherein the airfoil is alternately coupled to the elongate sections so that the pressure surface lies between the suction surface and the elongate sections, and wherein the airfoil is moveable in opposite directions when alternately coupled to the first elongate section and second elongate section;
a bridle system coupling at least one of the first and second elongate sections to an anchor; and
a power generator to harvest power from an atmospheric wind through the movement of the airfoil.

12. The apparatus of claim 11, further comprising
a terminal connecting the first elongate section to the second elongate section, wherein a distance from a start to an end of the terminal is shorter than a distance from a start to an end of the first elongate section and shorter than a distance from a start to an end of the second elongate section.

13. The apparatus of claim 11, further comprising:
a terminal connecting the first and second elongate sections, wherein the airfoil pitches as it travels along the terminal.

14. The apparatus of claim 11, further comprising:
a terminal connecting the first and second sections, wherein the airfoil pitches or yaws as it travels along the terminal; and
multiple towers, wherein each tower is coupled to at least one of the first and second sections.

15. The apparatus of claim 11, further comprising
a terminal connecting the first and second sections, wherein the first and second sections are held in tension, and wherein
the first and second sections are elevated more than 13 meters above ground level or the airfoil has greater than 10 meters of clearance above ground level.

16. A method of extracting power comprising:
providing a first elongate section;
providing a second elongate section;
coupling an airframe to the elongate sections, wherein the airframe comprises a suction surface and a pressure surface, and wherein the airframe is alternately coupled to the elongate sections so that the pressure surface lies between the suction surface and the elongate sections;
positioning the elongate sections so that the airframe travels crosswind to an atmospheric wind;
attaching a bridle system to at least one of the first and second elongate sections; and
anchoring the bridle system.

17. The method of claim 16, the method further comprising:
providing a terminal connecting the first and second elongate sections;
coupling the airfoil to the elongate sections and the terminal such that the airfoil pitches as it travels along the terminal; and
harvesting power from the atmospheric wind through the movement of the airfoil.

18. The method of claim 16, the method further comprising:
providing a terminal connecting the first and second sections, wherein a distance from a start to an end of the terminal is shorter than a distance from a start to an end of the first elongate section and shorter than a distance from a start to an end of the second elongate section.

19. The method of claim 16, the method further comprising:
providing a terminal connecting the first and second sections, wherein coupling the airframe to the elongate sections comprises coupling the airfoil to the first section, second section, and terminal such that the airfoil pitches or yaws as it travels along the terminal;
providing multiple towers; and
coupling each tower to at least one of the first and second sections.

20. The method of claim 16, the method further comprising:
providing a terminal connecting the first and second sections, wherein coupling the airfoil to the first and second section comprises coupling the airfoil such that it travels linearly along the first and second sections;
providing towers;
coupling each tower to at least one of the first and second sections; and automatically changing a total area of the airfoils in accordance with changing wind conditions.

* * * * *